United States Patent [19]

Carter, Jr. et al.

[11] Patent Number: 4,753,994
[45] Date of Patent: Jun. 28, 1988

[54] FLAME RETARDANT POLYCARBONATE COMPOSITIONS

[75] Inventors: Russell P. Carter, Jr., New Martinsville, W. Va.; Ulrich Grigo, Kempen, Fed. Rep. of Germany; Sivaram Krishnan; Mark W. Witman, both of Pittsburgh, Pa.; Klaus Kircher, Leverkusen, Fed. Rep. of Germany; Hans-Jurgen Kress, Pittsburgh, Pa.; Wolfgang Alewelt, Krefeld, Fed. Rep. of Germany

[73] Assignees: Mobay Corporation, Pittsburgh, Pa.; Bayer Aktiengesellschaft, Leverkusen, Fed. Rep. of Germany

[21] Appl. No.: 936,852

[22] Filed: Dec. 2, 1986

[51] Int. Cl.$^4$ .............................................. C08L 69/00
[52] U.S. Cl. ..................................... 525/146; 525/468
[58] Field of Search ....................... 525/146, 148, 468; 528/491, 494, 495, 497, 498

[56] References Cited

U.S. PATENT DOCUMENTS

| | | | |
|---|---|---|---|
| 3,005,795 | 10/1961 | Busse et al. | 525/146 X |
| 3,290,412 | 12/1966 | Goldblum | 260/873 |
| 3,294,871 | 12/1966 | Schmitt et al. | 525/154 X |
| 3,723,373 | 3/1973 | Lucas | 260/29.6 |
| 3,940,455 | 2/1976 | Kaufman | 260/888 |
| 4,208,489 | 6/1980 | Schmidt et al. | 525/146 |
| 4,220,583 | 9/1980 | Mark | 260/45.7 |
| 4,391,935 | 7/1983 | Bialous et al. | 524/82 |
| 4,579,906 | 4/1986 | Zabrocki et al. | 525/72 |
| 4,656,227 | 4/1987 | Lindner et al. | 525/133 |

FOREIGN PATENT DOCUMENTS

| | | |
|---|---|---|
| 3322260 | 1/1985 | Fed. Rep. of Germany . |
| 3417476 | 11/1985 | Fed. Rep. of Germany . |
| 3418750 | 11/1985 | Fed. Rep. of Germany . |
| 3420002 | 12/1985 | Fed. Rep. of Germany . |
| 3422862 | 1/1986 | Fed. Rep. of Germany . |
| 3512638 | 2/1986 | Fed. Rep. of Germany . |

OTHER PUBLICATIONS

J. F. Lontz et al, Teflon Tetrafluoroethylene Resin Dispersion, Industrial & Engineering Chemistry, vol. 44, No. 8, 1952, p. 1800.

*Primary Examiner*—Theodore E. Pertilla
*Attorney, Agent, or Firm*—Gene Harsh; Joseph C. Gil; Aron Preis

[57] ABSTRACT

The present invention is related to polycarbonate molding compositions containing a co-precipitate of a polycarbonate resin and a fluoropolymer. This co-precipitate was found to be suitable as an additive for polycarbonate resins because it offers improved dispersibility with the resin and good flammability performance as well as aesthetic characteristics. The co-precipitate is prepared by first mixing an aqueous dispersion of a fluoropolymer with a polycarbonate solution and then precipitating both using a suitable precipitation agent. After isolation washing and drying the co-precipitate of the invention is suitable for incorporation in a polycarbonate resin optionally with known flame retarding agents. Molded parts prepared from the compositions of the invention are characterized by their improved homogeneity and flame retardance.

10 Claims, No Drawings

FLAME RETARDANT POLYCARBONATE COMPOSITIONS

FIELD OF THE INVENTION

The present invention is directed to polycarbonate molding compositions and more particularly flame retardant polycarbonate compositions containing fluoropolymers.

SUMMARY OF THE INVENTION

The present invention is related to polycarbonate molding compositions containing a co-precipitate of a polycarbonate resin and a fluoropolymer. This co-precipitate was found to be suitable as an additive for polycarbonate resins because it offers improved dispersibility with the resin and good flammability performance as well as aesthetic characteristics. The co-precipitate is prepared by first mixing an aqueous dispersion of a fluoropolymer with a polycarbonate solution and then precipitating both using a suitable precipitation agent. After isolation washing and drying the co-precipitate of the invention is suitable for incorporation in a polycarbonate resin optionally with known flame retarding agents. Molded parts prepared from the compositions of the invention are characterized by their improved homogeneity and flame retardance.

BACKGROUND OF THE INVENTION

Flame retardant polycarbonate compositions containing polytetrafluoroethylene (PTFE) are known in the art. U.S. Pat. No. 4,391,935 discloses such compositions which also include certain salts. U.S. Pat. No. 3,294,871 discloses a process for producing molding compositions containing PTFE and a thermoplastic polymer entailing blending the thermoplastic polymer with a latex of the PTFE to produce a dispersed, substantially homogeneous mixture of the PTFE and a thermoplastic polymer and recovering the composition by removing the volatiles therefrom. Among the polymers polycarbonates are listed at col. 3, lines 6–8. The disclosed compositions are said to offer advantages in terms of impact strength, melt index, coefficient of friction, low water permeability and increased HDT.

U.S. Pat. No. 3,005,795 discloses compositions containing PTFE resin in a form of finely divided microfibrous and submicrofibrous particles. Polycarbonates are disclosed at col. 3, lines 18–19 as a suitable matrix. Improved moldability of PTFE resins is disclosed in U.S. Pat. No. 3,290,412 to result upon adding thereto of 10 to 40% of polycarbonates.

U.S. Pat. No. 3,723,373 discloses adding PTFE emulsion to polyethylene terephthalate for improved processability. French patent No. 1,412,767 addresses problems associated with the moldability of PTFE.

Lontz et al in *Industrial and Engineering Chemistry*, Vol. 44, No. 8 (1952) at page 1800 describes the general dispersion properties in film forming characteristics of PTFE. Coagulation of the dispersion by the addition of electrolytes or other solvents or by other means is also disclosed.

German published specification DE-OS No. 33 22 260 discloses PTFE co-precipitated with ABS and added to polycarbonate. Related technologies are disclosed in EP-OS. No. 0,154,138, which discloses a system entailing ABS and Teflon, DE-OS. No. 34 17 476 which discloses the system of polyamides and Teflon and DE-OS, No. 34 18 750 which concerns the system of ABS co-precipitated with PTFE. Also of relevance are DE-OS No. 34 20 002, DE-OS No. 34 22 862, DE-OS No. 35 12 638 (equivalent to EP-OS No. 0,174,493) DE-OS No. 29 48 439 and U.S. Pat. No. 4,208,489.

U.S. Pat. No. 3,940,455 discloses the incorporation of Teflon in elastomeric hydrocarbons by dissolving the elastomeric polymer in a solvent and incorporating the PTFE to form a suspension and subsequently co-precipitating both by mixing the suspension with a nonsolvents. The co-precipitate is said to exhibit improved physical properties.

DETAILED DESCRIPTION OF THE INVENTION

In the present context the aromatic polycarbonates are homopolycarbonates and copolycarbonates both of which are well recognized resins. Preferred resins are the ones produced from the following dihydroxy compounds: hydroquinone, resorcinol, dihydroxydiphenyls, bis-(hydroxyphenyl)-alkanes, bis-(hydroxyphenyl)-cycloalkanes, bis-(hydroxyphenyl) -sulfides, bis-(hydroxyphenyl)-ketones, bis-(hydroxyphenyl)sulfoxides, bis-(hydroxyphenyl)-sulfones, 4,4'-bis-(hydroxyphenyl)-diisopropylbenzenes, including in each case the alkyl- or halogen- substituents on the aromatic nuclei. These and other suitable diphenols are described in U.S. Pat. Nos. 3,028,365, 3,148,172, 3,275,601, 2,991,273, 3,271,367, 3,062,781, and 2,999,846, in the German Offenlegungsschriften Nos. 1,570,703, 2,063,050, 2,063,052, 2,211,956, 2,211,957, the French patent No. 1,561,518 and the monograph "H. Schnell, Chemistry and Physics of Polycarbonates", Interscience Publishers, New York, 1964, all of which are incorporated by reference herein.

Particularly preferred dihydroxy compounds are: 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-cyclohexane, 4,4'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, 2,2- bis-(3,5-dimethyl-4-hydroxyphenyl)methane, Z,Z-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, 4,4'-bis-(3,5-dichloro-4-hydroxyphenyl)-propane, 2,2-bis-(3,5-dibromo-4-hydroxyphenyl)-propane. Those most preferred as the following: 2,2-bis-(4-hydroxyphenyl)-propane, 2,2-bis-(3,5-dimethyl-4-hydroxyphenyl)-propane, 2,2-bis-(3,5-dichlor-4-hydroxyphenyl)-propane, 2,2-bis-(3,5-dibromo-4-hydroxyphenyl)-propane, and 1,1-bis-(4-hydroxyphenyl)-cyclohexane. Preferred aromatic polycarbonates are those which are based on one or more of the diphenols mentioned as preferred. Particularly preferred are homopolycarbonates which are based on bisphenol A. The preparation processes of aromatic polycarbonates such as by melt transesterification from bisphenol and diphenyl carbonates or in solution from bisphenol and phosgene such as by the pyridine process or by a two-phase boundary process are well known in the art. In the context of the invention the aromatic polycarbonates may be branched such as by the incorporation of small amounts, preferably between 0.05 and 2.0 mol % (based on the dihydroxy compound), of polyfunctional compounds, e.g. those with 3 or more aromatic hydroxyl functionalities. The aromatic polycarbonate should have a weight average molecular weight of 5,000 to about 200,000, preferably 20,000 to about 80,000 (determined by measurement of the relative viscosity in methylene chloride at 25° C. at a concentration of .5% by weight).

Among the suitable fluoropolymers there are polymers having fluorine contents of 65 to 76% by weight preferably 70 to 76% by weight. Examples are polytetrafluoroethylene (PTFE) tetrafluorethylene-hexafluoropropylene copolymers and tetrafluoroethylene copolymers optionally copolymerized with small amounts of fluorine-free ethylenically unsaturated monomers. These polymers are well known. They are characterized in their fine particle size and are available as aqueous dispersions having a solid content of between 30 and 70% by weight. Among the PTFE dispersions suitable in the present context is Teflon 30 N resin from duPont. These are characterized in that the PTFE resin is present as particles having a size distribution of between 0.1 and 10 microns.

Suitable precipitation agents in the present context are those which are generally used in the context of polycarbonate technology. For instance, esters, aromatic hydrocarbons, aliphatic hydrocarbons, alcohols, carbonates, ethers and ketones. Examples of preferred precipitation agents are: ethyl acetate, toluene, methanol ethanol, cyclohexane, n-heptane, isooctane, diethylcarbonate, glycol carbonate, dibutylether and acetone.

In the practice of the invention it is preferred to first prepare a co-precipitate of the fluoropolymer in polycarbonate from a polycarbonate solution and a dispersion of the fluoropolymer. This concentrate is then added as a component in the preparation of flame retardant polycarbonate molding compositions. It is important to impart sufficient agitation in the preparation of the co-precipitates of polycarbonate and the fluoropolymer. If the mixture is well stirred during the addition, the phases will not immediately separate even after the agitator is switched off. The solvents suitable for polycarbonates are known in the literature and among the preferred ones are halogenated hydrocarbons such as methylene chloride. Tetrahydrofuran may also be used. In one preferred version of practicing the invention, 3 parts by weight per hour of an emulsion consisting of an aqueous PTFE dispersion in polycarbonate solution and 1.5 to 12 parts by weight per hour of a precipitation agent were separately metered into the first agitator vessel of a cascade that consists of 2 agitator vessels with overflows. The polycarbonate is precipitated together with a PTFE as a co-coagulate. The obtained suspension flows through the overflow into the second agitator vessel where the precipitation is completed. The reaction mixture is heated in both vessels to a temperature of about 30° C. After going through the second agitator vessel the resulting coagulate is filtered washed and dried. Washing may be carried out by conventional means using water, or an aqueous solution of acetic acid methanol or the like. The co-precipitate of the invention is used as an additive in polycarbonate and the composition is suitable for polycarbonate molding compositions which may advantageously be used in thermoplastic molding of articles including extruded films and sheets. The co-precipitate is mixed in known devices in the melt optionally with further additives such as flame retardants and/or pigments and other conventional additives. Among the conventional flame retardant additives which are suitable in the present context are alkali and alkaline earth salts of sulphonic acids. Examples of such additives are listed in German patent Nos. 1,930,257 and 2,903,100. Other conventional flame retarding agents such as cryolite and other inorganic halogen-containing alkali or alkaline earth salts may also be added.

In accordance with the invention, a solution of an aromatic polycarbonate and an aqueous dispersion of PTFE having a solids content of between 5 and 60% by weight, are mixed under rigorous stirring. The PTFE content relative to the amount of polycarbonate is between 0.01 and 40% by weight. The mixture is precipitated with a suitable precipitation agent and the obtained mixture is isolated, dried and pelletized. The pellets may then be mixed and processed with additional polycarbonate resins optionally together with conventional flame retardance in the melt. The molding compositions produced in accordance with this invention are uniformly translucent and exhibit good flammability rating in accordance with UL 94. In comparison to compositions which contain a blend of PTFE with polycarbonate, the present composition features better surface characteristics (less streaking and splay) and comparable or better flammability performance.

The invention is further illustrated, but is not intended to be limited by the following examples in which all parts and percentages are by weight unless otherwise specified.

EXAMPLES

EXAMPLE 1

Preparation of a polycarbonate/PTFE cocoagulate (PC/PTFE coagulate) concentrate by a continuous process was carried out as follows. In an agitator vessel consisting of two agitator vessels equipped with overflows, 3 pbw per hour of an emulsion of 1.6 pbw of a 50% aqueous tetrafluoroethylene polymer dispersion in water in 100 pbw of a 15% polycarbonate solution in methylene chloride (relative viscosity=1.29, measured in a concentration of 0.5 g/100 ml in methylene chloride at 25° C.) and 1.8 pbw 2,2,4-trimethylpentane are separately metered into the first agitator vessel. The polycarbonate precipitates together with the PTFE as a coarse-particle powder. The suspension of PC/PTFE in methylene chloride, trimethylpentane and water flows through the overflow into the second agitator vessel, where the precipitation is completed. The reaction mixture is heated in both vessels to a temperature of 30° C. The average residence time in each vessel is about 10 minutes. The resulting PC/PTFE powder is filtered off washed with water and dried for four hours in a vacuum chamber at 160° C.

EXAMPLE 2

The preparation of PC/PTFE coagulate in a batch process.

100 grams of polycarbonate powder were dissolved in 600 ml of methylene chloride—solution I—in a 1 liter beaker. In a second beaker there were introduced 100 grams of a 50% aqueous dispersion of PTFE—particle size 0.5-1.0 microns—and 500 ml of water (dispersion B). Solution I and dispersion B are mixed and slowly stirred so that no polycarbonate precipitates. The mixture was then poured in 1800 ml solutions of methanol acetic acid/$CaCl_2$ (1:1) to coagulate the mixture while continuously stirring. The precipitate was filtered and washed with methanol and then dried for 4 hours in a vacuum chamber at 120° C. The resulting product contained about 33% by weight of PTFE.

EXAMPLE 3

166 grams of a 55.0% aqueous PTFE dispersion and 6000 grams of a 15% polycarbonate solution in methylene chloride were introduced into an agitator vessel and mixed. The mixture was coagulated in about 20 liters of acetone. Filtering, washing and drying followed the corresponding procedure as described above. The resulting product contained 10% by weight of PTFE.

EXAMPLE 4

In a procedure similar to that of Example 3 there were mixed 266.6 grams of 50% aqueous dispersion of PTFE and 5000 grams of 15% polycarbonate solution in methylene chloride. Precipitation was carried out in 20 liter ethanol. The resulting product contained 15% by weight of PTFE.

EXAMPLE 5

99 parts of bisphenol A based homopolycarbonate were mechanically mixed with 1 part of PTFE (ASTM type 3) in powdered form. The mix was extruded (ZSK 53 twin screw extruder—Werner & Pfleiderer) at about 300° C. (maximum melt temperature) at 60 rpm. The strands thus produced were immediately pelletized. The material was then injection molded (Aarburg degasification injection molding machine) at a maximum melt temperature of about 320° C., to produce discs having a diameter of 80 mm and a thickness of 2 mm.

Holding the plates up to a light source, the highly inhomogeneous distribution of the tetrafluoroethylene polymer phase becomes apparent. Some approx. 1 mm long sections can be seen, roughly in the same direction as the flow, and some areas having a slight but uniform turbidity, while some areas being almost turbidity-free are located next to each other.

The use of a molded part of this type is not likely even in applications requiring only marginal optical quality.

EXAMPLE 6

In much the same way as in Example 5 molded parts containing 95 parts of bisphenol A homopolycarbonate and 5 parts of PTFE were produced. The resulting moldings are less translucent, and the PTFE phase can be easily recognized on the surface in partially large agglomerations sometimes more than 1 mm long and somewhat less wide, where the inhomogenities are oriented in the direction of flow.

EXAMPLE 7

90 parts of a bisphenol A polycarbonate were mixed and processed as described in Examples 5 and 6 with 10 pbw of PTFE. Even with this very high amount of PTFE, the same negative effects were found. The molding compound is not suitable for the production of molded parts for applications requiring aesthetic qualities.

EXAMPLE 8

An aromatic polycarbonate based on bisphenol A (relative viscosity of 1.285 as measured in $CH_2Cl_2$ at 25° C. in a concentration of 0.5 g/100 ml) was mixed with 4.1% by weight of the polycarbonate/tetrafluoroethylene polymer coagulate of Example 1 and extruded at a melt temperature of 300° C. and further processed into pellets. The 2 mm thick discs produced from the molding compound obtained in this manner were uniformly translucent.

The dependence of surface appearance of flame retardant polycarbonate compositions on the method of the introduction of PTFE was evaluated. A comparison was made between the performance of compositions within the invention and their counterpart where the PTFE was introduced as a conventionally blended additive. The flammability performance per UL-94 1.6 mm and 3.2 mm was identical for both types of compositions, i.e. V-0. Compositions containing 0.15 and 0.20% PTFE show identical flammability rating independent of the method for the introduction of PTFE. One the other hand, the results show that parts made of compositions where the PTFE was introduced as a conventionally blended additive were optically inhomogeneous and had surface streaks. The compositions in accordance with the invention produced optically homogeneous parts which were free of surface streaks.

EXAMPLE 9

100 grams of dissolved polycarbonate resin in methylene chloride was mixed with 151.5 grams of latex (made of 50 grams of solid PTFE and 150 grams of water). This slurry was added to a blender that contained a methanol solution containing 1% of $CH_3COOH$ and 1% of calcium chloride. The polycarbonate/latex was added to the solution slowly while mixing. The solution was filtered and the resulting powder was washed and dried.

Polycarbonate compositions containing the co-coagulant of the invention were prepared and their properties determined. The table below summarize the results of the evaluations.

| Compositions | 1 | 2[1] | 3 | 4 |
|---|---|---|---|---|
| Co-coagulated | | | | |
| PC/PTFE, % | 0.648 | 0.646 | 0.32 | 0.32 |
| % PTFE | 0.24 | 0.24 | 0.12 | 0.12 |
| Flame Retarding[2] agent, % | 0.24 | 0.49 | 0.24 | 0.15 |
| Impact strength, ⅛" Notched Izod, ft.lbs./in. | 2.63 | 1.51 | 2.38 | 3.85 |
| Melt flow,[3] gm/10 min. | 3.4 | 11.7 | 4.4 | 3.0 |
| Flammability test | | | | |
| UL-94 @ 1/16" | V-0 | V-0 | V-0 | V-0 |
| UL-94 @ ⅛", 5V | pass | pass | pass | pass |
| UL-94 @ 1/16", 5V | pass | fail | fail | pass |

[1]Branched homopolycarbonate, melt flow rate 7.4 grams/10 min. the remaining compositions were based on Merlon HMS 3118, which is a branched homopolycarbonate having a melt flow rate of about 2.0 gram/10 min.
[2]The flame retarding agent used in examples 1, 2, and 3 was cryolite; in example 4, the agent was potassium perfluorobutane sulfonate.
[3]In accordance with ASTM D-1238 condition O.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for incorporating a fluoropolymer in polycarbonate composition comprising adding an aqueous dispersion of a fluoropolymer to a polycarbonate solution, agitating the mixture thus formed, adding a precipitation agent to cause co-precipitation of the polycarbonate and said fluoropolymer, filtering the co-precipitate washing and drying the filtrate.

2. The process of claim 1 wherein precipitation agent is selected from the group consisting of ethyl acetate, toluene, ethanol, methanol, cyclohexane, n-heptane, isooctane, diethylcarbonate, glycol carbonate, dibutylether and acetone.

3. The co-precipitate produced in accordance with the process of claim 1.

4. A thermoplastic molding composition comprising a polycarbonate resin and the co-precipitate of claim 3.

5. The process of claim 1 wherein said fluoropolymer is polytetrafluoroethylene.

6. The co-precipitate produced in accordance with the process of claim 5.

7. A thermoplastic molding composition comprising a polycarbonate resin and co-precipitate of claim 6.

8. An extruded sheet comprising the composition of claim 4.

9. An extruded film comprising the composition of claim 4.

10. A co-extruded film comprising the composition of claim 4.

* * * * *